Feb. 1, 1966 L. HUBER 3,232,535
HEATING SYSTEM FOR VEHICLES
Filed July 7, 1961 2 Sheets-Sheet 2

INVENTOR
Ludwig Huber

BY Bailey, Stephens, Huettig
ATTORNEYS

## United States Patent Office 3,232,535
Patented Feb. 1, 1966

3,232,535
HEATING SYSTEM FOR VEHICLES
Ludwig Huber, Stuttgart-Degerloch, Germany, assignor of one-half to J. Eberspächer, Esslingen (Neckar), Germany, a German firm
Filed July 7, 1961, Ser. No. 122,441
Claims priority, application Germany, May 31, 1960, E 19,394
7 Claims. (Cl. 237—32)

The present invention relates to a heating system for vehicles, and especially motor vehicles, and it is the primary object of this invention to provide a removable heating unit which may be easily and quickly installed on a vehicle at different parts thereof, for example, for either preheating the vehicle engine or for heating the cab or body of the vehicle.

More particularly, the invention relates to the application of a heating unit of the type as described in U.S. Patent 3,125,855. It is therefore a further object of the invention to provide a vibration burner of the type as described in this copending application as a heating source for heating different parts of a vehicle.

Prior to this invention, there have been many different types of heating systems for motor vehicles, all of which were permanently mounted in a fixed position in the vehicle and which included a series of conduits and pipes for connecting the different parts of the system and suitable control valves for directing the heat, either to the engine compartment or to different parts of the vehicle body. These known heating units are usually designed so that at first when the vehicle is started, the engine compartment or the cooling water is heated and that thereafter the heat may be directed as desired either to the cab or to other parts of the vehicle body. The control valves necessary for this purpose are usually operated by Bowden cables or levers which may be manipulated by controls on the dashboard of the vehicle.

These prior heating systems are very expensive, especially because of the required connecting conduits and control devices. They also have the disadvantage that, due to these connecting conduits and pipe lines, the noise produced by the motor of the heating unit, which is often increased by the resonance of certain vehicle parts, is transmitted to the cab or body of the vehicle, especially if this motor is an internal combustion engine. Although auxiliary heating units of this type may be designed so as to operate very economically for preheating the vehicle engine and for heating the body of the vehicle, this noise transmission has been one of the reasons why such heating units have often been rejected.

The heating system according to the present invention is designed to overcome all of these disadvantages, since it does not require any connecting conduits or pipe lines or the devices for controlling them. Essentially, the invention consists in the provision of heat exchangers which are mounted at the particular points of the vehicle to be heated and are designed so as to permit the vibrating tube of the heating unit to be inserted into either of these heat exchangers, and to be secured thereto or to the vehicle itself by a quick-acting locking device.

The invention therefore permits a versatile application of one and the same heating unit without requiring any connecting conduits, pipe lines, control valves, or other control elements. The use of the heating unit according to the invention is also not limited to the vehicle itself, but it may also be utilized for other heating purposes, for example, for heating quarters of any kind such as shelters, tents, barracks, and the like. For this purpose, it is another feature of the invention also to mount one of the heat exchangers on the vehicle by means of quick-acting locking means so as to be easily and quickly removable from the vehicle and by resiliently mounting the heat exchanger on a frame on which it may be easily carried to any other place. This frame also carries the quick-acting locking means which are operatively associated with suitable holders on the vehicle body. The heat exchanger which is thus mounted on the vehicle body may be connected to a gas turbine, as described in the mentioned copending application, by means of which fresh air is passed over the surfaces of the heat exchanger and then conducted to the areas to be heated. In order to permit the heat exchanger to be easily applied at different places the outlet sockets provided thereon for the cold and hot air, after being inserted into the air conduits of the vehicle body, are pressed against resilient sealing surfaces on these air conduits. This has also the advantage that the transmission of the noise of operation of the turbine will be considerably reduced. For the same purpose, the outlet socket for the exhaust gases which is provided on the heat exchanger between the latter and the turbine is also separated from the exhaust pipe which is mounted on the vehicle body. According to another feature of the invention, the place of separation between the exhaust outlet on the heat exchanger and the exhaust pipe on the vehicle itself is provided in the form of an injector in which the exhaust line on the vehicle forms a mixing nozzle into which the exhaust outlet socket of the heat exchanger projects. This type of construction actually becomes possible only if the heating source consists of a vibration burner. The energy of the gases of such a burner is generally great enough to insure that the exhaust gases will be passed through the place of interruption of the exhaust line, even though the latter may have a small diameter, and that the gases will thus be safely discharged toward the outside. Due to the provision of the injector or mixing nozzle, outside air will also be sucked up into the exhaust which suppresses the vibrations of the exhaust gases.

The objects, features, and advantages of the present invention will become more clearly apparent from the following detailed description thereof which is to be read with reference to the accompanying drawings, in which—

FIGURE 1 shows a side view, partly broken away and in section, of a motor vehicle and the points thereof to be heated; while

Figure 1:
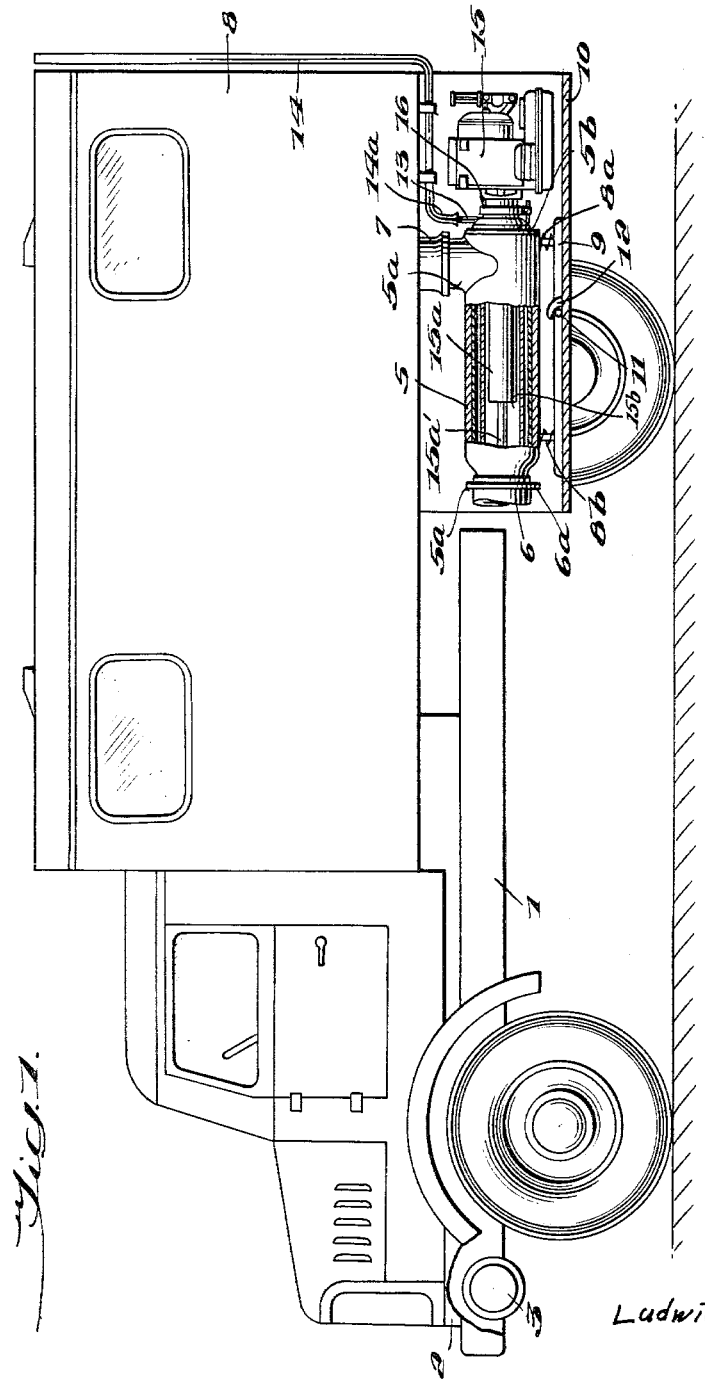
Figure 2:
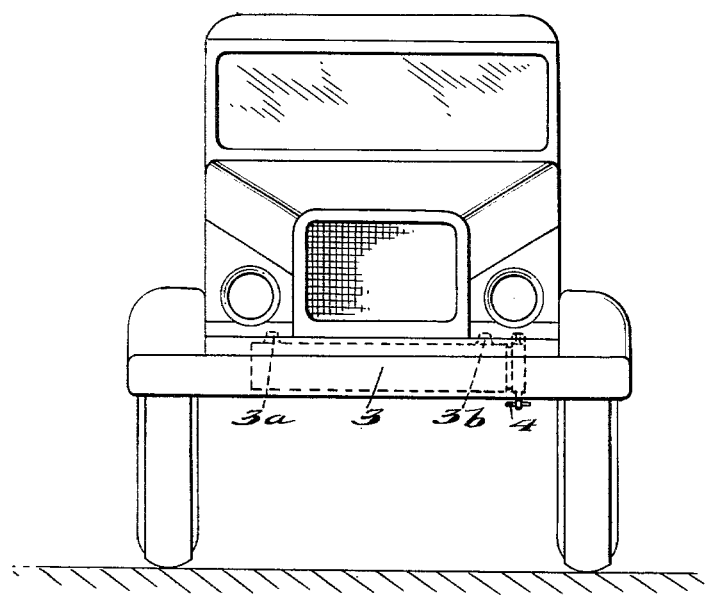
FIGURE 2 shows a front view of the same motor vehicle, in which the position of the heat exchanger according to the invention is indicated in dotted lines.
Figure 3:
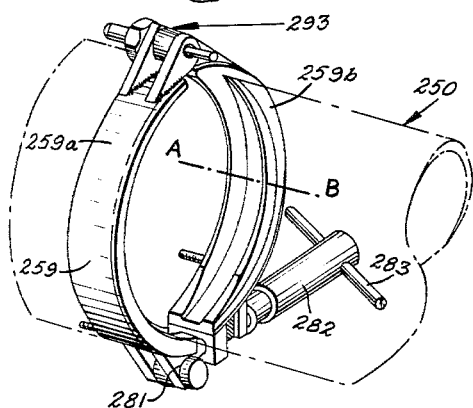
FIGURE 3 shows in perspective a quick-acting clamping means.
Figure 4:
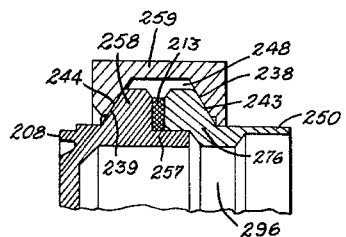
FIG. 4 is a cross section through a portion thereof.

Referring to the drawings, FIGURE 1 shows the general arrangement of the heat exchangers 3 and 5 according to the invention which are designed and mounted in accordance with the different heating purposes. The heat exchanger 3 (of the type shown in Patent No. 3,125,855) is mounted on the chassis 1 of the vehicle underneath the engine hood 2, and it is connected to the cooling-water circulation system of the vehicle internal combustion engine by means of connection fittings 3a and 3b, as indicated in FIGURE 2. The vibration burner unit (of the type shown at 47 in Patent 3,125,855) which is normally mounted on the vehicle may be inserted into this heat exchanger 3 for preheating the engine and it may be secured thereto by a suitable quick-locking device 4. Such a burner includes a turbo-blower, a combustion chamber, and means for supplying and igniting fuel, and a vibration tube.

The construction of the mounting means is illustrated in FIGURE 1 in connection with the heat exchanger 5 (of the type shown in FIGURE 2 of the Patent No.

3,125,855) which is associated with the car body 8. This heat exchanger is an air heater into which the heating air is sucked through the pipe socket 6 and is then passed through the pipe socket 7 to the inside of the body 8 of the vehicle. Both pipe sockets 6 and 7 consist of a resilient material, such as rubber. Heat exchanger 5 is mounted on a frame 9 by means of resiliently cushioned feet 8a and 8b. Contrary to the heat exchanger 3, this heat exchanger 5 is secured within a compartment 10 underneath the car body 8 so as to be easily removable therefrom. For this purpose, pipe sockets 6 and 7 for conducting the heating air are not solidly connected to the heat exchanger 5 but at their points of connection to the inlet and outlet of the heat exchanger 5 they merely surround the same. When being inserted into the compartment 10, the heat exchanger 5 slides into this compartment on its frame 9 and it is then pressed with its end surface 5b against the flange 6a of pipe socket 6 which yields because of its resilient properties so that bolts 11 which are provided at both sides of frame 9 are passed over the inclined surfaces of the locking hooks 12, which are secured to the bottom of the compartment 10, and into the hook-shaped locking points thereof in which they are held by springs or very simply by the cushion effect of the pipe socket 6. It is then merely necessary to watch that the heating-air outlet 5a' will pass properly under the pipe socket 7 which is likewise resilient, and that the short pipe 13 on the end of the heat exchanger 5 is inserted into the exhaust-gas line 14 which is mounted on the car body. This exhaust-gas line 14 is conically enlarged at its end 14a and operates as a mixing nozzle of the injector which is formed thereby in combination with the end of the exhaust-gas pipe 13 which extends for a certain distance into it. The heat exchanger 5 may thus be very easily and quickly connected to and removed from the vehicle. The bottom of the compartment 10 may also be provided at both sides of frame 9 with guide rails in order to facilitate the insertion of the heat exchanger 5.

In the embodiment of the invention as illustrated in FIGURE 1, the heating unit or vibration burner 15 is inserted together with the combustion chamber 15a and the vibration tube 15a' into the interior space 15b of exchanger 5, from which leads exhaust line 14, and it is secured at 5b to the rear part of the heat exchanger 5 by means of a quick-acting locking device 16. This locking device 16 may consist of a bayonet lock with associated locking members on the heat exchanger 5 and on the vibration burner 15. This vibration burner 15 which is thus connected to the heat exchanger 5 may, after bolts 11 are unhooked from the locking hooks 12, be carried at any time to any other location, for example, to a shelter or tent for heating the same. If the engine should be preheated, the vibration burner 15 is disconnected from the heat exchanger 5 and inserted into the heat exchanger 3 underneath the engine hood 2. As already described with reference to FIGURE 2, it is then secured to the heat exchanger 3 by means of the quick-acting lock 4a.

The quick acting means may be carried by parts 208 and 250 connected with the heat exchanger 5 and the burner 15 respectively. These parts carry annular flanges 253 and 276. These are engageable by the groove 248 on a clamping ring 259 which is divided in two parts, 259a and 259b connected by a pin hinge 293. The rings and groove have cooperating sloping surfaces 238–239 and 243–244 respectively, by which the annular flanges are clamped towards each other. A gasket 213 is provided between the flanges.

The two parts may be quickly released by a member 282 pivoted at 281 to one of the ring parts and having a stem engageable in a fork 284 in the other ring part. It can then be quickly tightened by turning part 282 which is turned on the stem by 283.

Although my invention has been illustrated and described with reference to the preferred embodiment thereof, I wish to have it understood that it is in no way limited to the details of such embodiment, but is capable of numerous modifications within the scope of the appended claims.

Having thus fully disclosed my invention, what I claim is:

1. In combination with a vehicle having an internal combustion engine having a cooling system and a body, first and second heat exchangers carried by the body, a connection from the cooling system to the first heat exchanger, a connection from the interior of the body to the second heat exchanger, means to admit air to the second heat exchanger to flow therethrough into the body, such second heat exchanger having an interior space separated from said connecting means and said air admitting means, and an exhaust passage leading from such space to the outside, said first heat exchanger and said interior space of the second heat exchanger each having an opening of similar shape adapted to receive a heating unit, a single interchangeable heating unit adapted to be at least partly inserted into said opening of either of said heat exchangers, and quick-acting locking means for removably securing said heating unit in heat delivering position to either of said heat exchangers.

2. In combination with a vehicle having an internal combustion engine having a cooling system and a body, first and second heat exchangers carried by the body, a connection from the cooling system to the first heat exchanger, a connection from the interior of the body to the second heat exchanger, means to admit air to the second heat exchanger to flow therethrough into the body, such second heat exchanger having an interior space separated from said connecting means and said air admitting means, and an exhaust passage leading from such space to the outside, said first heat exchanger and said interior space of the second heat exchanger each having an opening at one end thereof, said opening being of similar shape in each of said heat exchangers and being adapted to receive a heating unit, a vibration burner comprising a turbo-blower, a combustion chamber, means for supplying and igniting fuel and a vibration tube, the vibration tube protruding at one end of said burner, said heating unit being adapted to be connected to either of said heat exchangers so that at least said vibration tube is inserted into said opening thereof, and quick-acting locking means for removably securing said vibration burner to either of said heat exchangers.

3. A heating system as defined in claim 2, in which said vibration burner is normally mounted on and partly inserted into said heat exchanger, and means for removably mounting said second heat exchanger on said vehicle body comprising a frame, releasable locking means for securing said frame to said vehicle body, and resilient means for connecting said second heat exchanger to said frame.

4. A heating system as defined in claim 3, further comprising an exhaust line mounted on said vehicle body, said second heat exchanger on said vehicle body having a gas outlet socket removably inserted into one end of said exhaust line without engaging the same.

5. A heating system as defined in claim 4, in which said gas outlet socket and said end of said exhaust line are associated with each other so as to form an injector.

6. A heating system as defined in claim 3, in which said second heat exchanger together with said vibration burner are adapted to be removed as one unit from said vehicle body for use at another place to be heated.

7. A heating system as defined in claim 3, in which said second heat exchanger has an inlet and outlet for the heating air, heating air conduits on said vehicle body, and resilient sealing members on the ends of said conduits facing toward said second heat exchanger when said heat exchanger is mounted on said vehicle body, said inlet and outlet then being applied under pressure against said resilient sealing members.

References Cited by the Examiner

UNITED STATES PATENTS

| | | | |
|---|---|---|---|
| 385,932 | 7/1888 | Henn | 126—56 |
| 814,296 | 3/1906 | Klausman | 126—56 |
| 1,773,870 | 8/1930 | Schmidt | 110—147 X |
| 1,780,942 | 11/1930 | Price | 158—76 |
| 2,089,601 | 8/1937 | Faber | 158—76 |
| 2,179,322 | 11/1939 | Brown | 237—12.3 |
| 2,210,049 | 8/1940 | Thompson | 126—350 |
| 2,405,145 | 8/1946 | Holthouse | 126—110 X |
| 2,414,214 | 1/1947 | Spackman | 237—50 |
| 2,708,926 | 5/1955 | Huber et al. | 158—4 X |
| 2,770,226 | 11/1956 | Tenney | 158—4 |
| 2,778,686 | 1/1957 | Daniel | 158—73 |
| 2,975,783 | 3/1961 | Dallenbach | 126—110 |

EDWARD J. MICHAEL, *Primary Examiner.*

FREDERICK L. MATTESON, JR., PERCY L. PATRICK, *Examiners.*